United States Patent
Ghag et al.

(10) Patent No.: US 10,735,259 B2
(45) Date of Patent: Aug. 4, 2020

(54) VIRTUAL SWITCH UPDATES VIA TEMPORARY VIRTUAL SWITCH

(71) Applicant: Nicira, Inc., Palo Alto, CA (US)

(72) Inventors: Aditi Ghag, Palo Alto, CA (US); Alexander Nicholas Tessmer, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/645,209

(22) Filed: Jul. 10, 2017

(65) Prior Publication Data

US 2019/0014000 A1     Jan. 10, 2019

(51) Int. Cl.
*H04L 12/24*     (2006.01)
*H04L 12/931*     (2013.01)

(52) U.S. Cl.
CPC .......... *H04L 41/082* (2013.01); *H04L 41/069* (2013.01); *H04L 49/70* (2013.01); *H04L 41/0816* (2013.01); *H04L 41/0836* (2013.01)

(58) Field of Classification Search
None
See application file for complete search history.

(56) References Cited

U.S. PATENT DOCUMENTS

| | | | | |
|---|---|---|---|---|
| 2012/0254863 A1* | 10/2012 | Baratakke | ........... | G06F 9/45533 718/1 |
| 2014/0112343 A1* | 4/2014 | Lambeth | ........... | H04L 45/04 370/392 |
| 2014/0115578 A1* | 4/2014 | Cooper | ........... | G06F 21/606 718/1 |
| 2014/0140221 A1* | 5/2014 | Manam | ........... | H04L 41/12 370/250 |
| 2014/0337529 A1* | 11/2014 | Antony | ........... | H04L 45/22 709/226 |
| 2015/0063364 A1* | 3/2015 | Thakkar | ........... | H04L 12/66 370/401 |
| 2015/0237013 A1* | 8/2015 | Bansal | ........... | H04L 63/0263 726/13 |
| 2015/0263991 A1* | 9/2015 | MacChiano | ........... | H04L 47/41 370/400 |
| 2016/0019044 A1* | 1/2016 | Stolarchuk | ........... | G06F 8/65 717/171 |
| 2016/0191427 A1* | 6/2016 | Baphna | ........... | H04L 49/70 370/254 |
| 2018/0026914 A1* | 1/2018 | Haris | ........... | H04L 49/00 709/220 |
| 2018/0034769 A1* | 2/2018 | Modi | ........... | H04L 45/122 |
| 2018/0159826 A1* | 6/2018 | YiSan | ........... | H04L 63/0236 |

* cited by examiner

*Primary Examiner* — Scott M Sciacca (57) ABSTRACT

Described herein are systems, methods, and software to enhance update operations of a virtual switch on a computing system. In one implementation, an operation on a host computing system may identify an update event for a first virtual switch executing thereon. In response to the update event, any virtual nodes mapped to the first virtual switch may be mapped to a second virtual switch. Once mapped, an update operation may be performed on the first virtual switch and, after completing the update operation, the virtual nodes may be remapped to the first virtual switch.

20 Claims, 8 Drawing Sheets

VIRTUAL SWITCH UPDATES VIA TEMPORARY VIRTUAL SWITCH

BACKGROUND

In computing environments, virtual switches may be used that comprise software modules capable of providing a communication platform for one or more virtual nodes in the computing environment. These virtual switches may provide switching operations, routing operations, distributed firewall operations, and the like, and may be used to intelligently direct communication on the network by inspecting packets before passing them to other computing nodes (both physical and virtual). For example, packets may be inspected to determine the source and destination internet protocol (IP) addresses to determine if the communication is permitted to be delivered to the destination computing node. In some implementations, software defined networks may be designed with packet forwarding configurations that indicate actions to be taken against each communicated packet. The packet forwarding configurations may identify specific attributes, such as IP addresses, media access control (MAC) addresses, and the like, within the data packet and, when identified, provide a set of actions to be asserted against the data packet. These actions may include modifications to the data packet, and forwarding rules for the data packet, amongst other possible operations.

In some implementations, the virtual switching software may require updates, which can provide additional stability and/or additional features and operations. Traditionally, these updates would require the shutdown of virtual nodes attached to a particular virtual switch, or a migration of the virtual nodes to a second host with a virtual switch. However, these update procedures may require the use of unnecessary computing resources, such as the second host computing system, or may require undesirable downtime during the shutdown or migration of the virtual nodes.

Overview

The technology disclosed herein enhances update processes for virtual switches in a computing environment. In one implementation, a method of updating a virtual switch on a host computing system includes identifying an update event for a primary virtual switch, wherein the primary virtual switch is mapped to one or more virtual network interfaces (VNICs) of one or more virtual nodes. The method further includes, in response to the update event, mapping the one or more VNICs of the one or more virtual nodes to a secondary virtual switch. The method also provides, in response to mapping the VNICs, initiating an update of the primary virtual switch, identifying a completion of the update, and after completing the update, mapping the one or more VNICs of the one of more virtual nodes to the primary virtual switch.

DETAILED DESCRIPTION

The various examples disclosed herein provide enhancements for managing updates to virtual switches. In particular, host computing systems may execute virtual switches that comprise software modules capable of providing switching operations, routing operations, distributed firewall operations, and the like. These modules may inspect the packets for various traits, such as internet protocol (IP) addresses, media access control (MAC) addresses, packet type information, or any other similar information, and provide forwarding operations based on the identified traits. The forwarding operations may include permitting a communication to be forwarded to the appropriate destination, blocking the communication, modifying the communication, or any other similar operation.

Here, during the execution of a virtual switch, wherein the virtual switch is mapped to one or more virtual network interfaces (VNICs) of the virtual nodes executing on the host computing system, the virtual switch may require an update. This update may be used to provide additional stability to the virtual switch or may provide additional functionality. To provide the update to the virtual switch, packet handling functions or resources (i.e., packet processing logic that may be disposed in certain kernel modules, user space code, or within a logical execution space such as a privileged virtual machine) upon which the virtual switch logic depends must be replaced and/or modified to provide the desired operation. Consequently, the virtual switch may be required to be shutdown or unloaded from memory to make the required modifications.

To support the update while maintaining connectivity configurations for the various virtual nodes, a second virtual switch may be initiated that does not require the same packet handling functions that are being updated for the first virtual switch. Once initiated, the virtual nodes may be migrated from the first virtual switch to the second virtual switch to maintain connectivity of the various VNICs of the virtual nodes. This ensures that modifications are not made to the configuration of the VNICs during the update of the virtual switch, such as modifications to the MAC addresses or link state for the virtual nodes. However, while the VNICs of the virtual nodes are coupled to the second virtual switch, the second virtual switch may not provide the same functionality as the first virtual switch. Rather, the second virtual switch may not use the same packet handling functions as the first virtual switch to ensure that the packet handling functions may be updated while the virtual nodes are connected to the second virtual switch.

For example, if firewall functions associated with a first virtual switch require an update to provide additional functionality, virtual nodes mapped to the first virtual switch may be mapped to a second virtual switch that does not require the same firewall function. This second virtual switch may maintain the VNIC configuration for the virtual nodes, but appear to the virtual nodes as though there is a network outage, preventing communication with other virtual and physical devices. Consequently, the firewall function may be updated without causing the virtual nodes to be shut down or migrated to another host computing system. Once the update is complete, which may occur when the firewall functions are updated and configured with the appropriate state information (forwarding configurations), the virtual nodes may be remapped to the first virtual switch to restore the full functionality of the first virtual switch to the virtual nodes.

In providing the second virtual switch to support the temporary connections, the virtual nodes may maintain their VNIC configurations. In particular, without connecting to the temporary virtual switch, if a VNIC identified that it was no longer mapped to a logical port, the VNIC may reset the available active connections. Instead, by connecting the VNICs to a second virtual switch, even if the second virtual switch does not provide the same network connectivity, the VNICs may be capable of maintaining Transmission Control Protocol (TCP) protocol configurations and other similar protocol configurations for communications by the virtual node.

Figure 1:
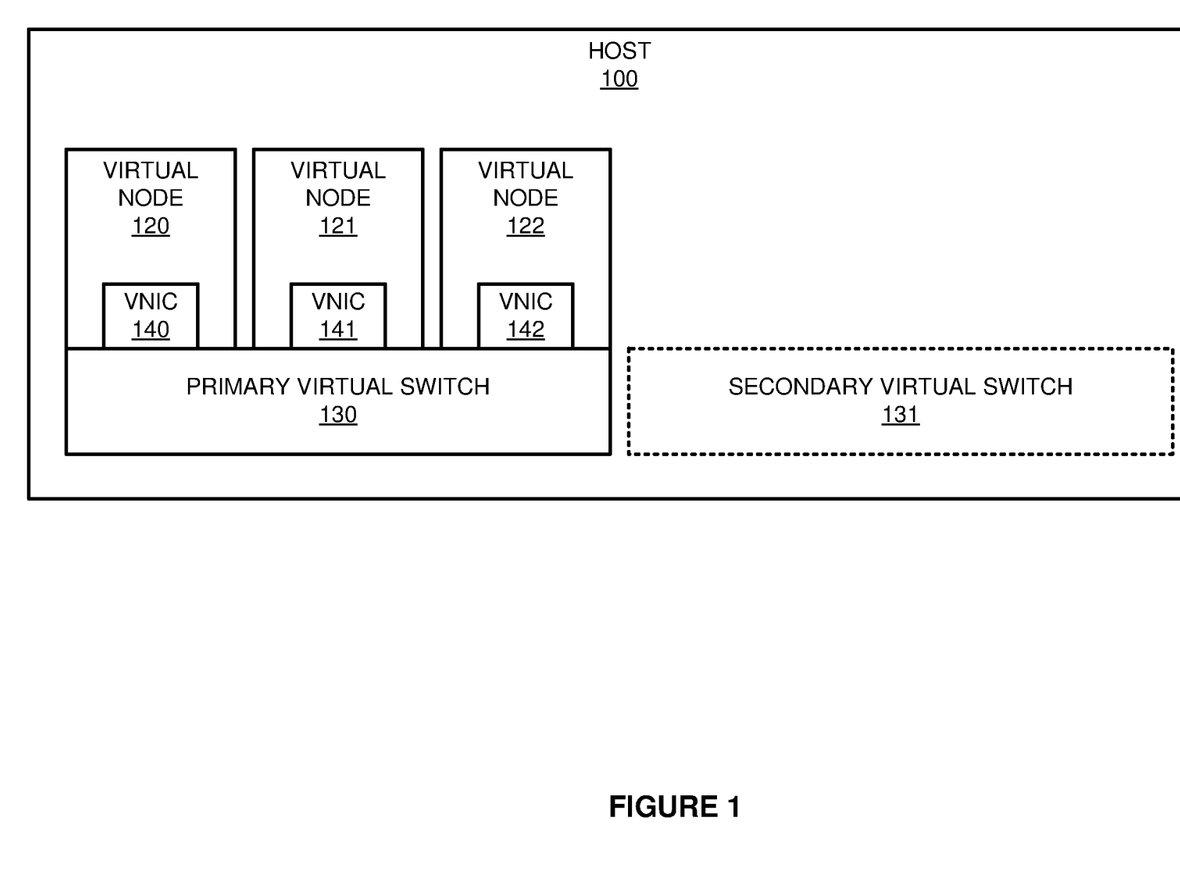
FIG. 1 illustrates a host for a plurality of virtual nodes according to an implementation.

FIG. 1 illustrates a host 100 for a plurality of virtual nodes according to an implementation. Host 100 includes virtual nodes 120-122, primary virtual switch 130, secondary virtual switch 131, and VNICs 140-142 that provide networking for virtual nodes 120-122, respectively. Although illustrated in the present example as three virtual nodes, it should be understood that a greater or fewer number of virtual nodes may be supported by host 100.

In operation, host 100 provides a platform for virtual nodes 120-122 to execute and provide various operations on host 100. These virtual nodes may comprise full operating system virtual machines in some implementations, which are each allocated their own operating system and are provided with abstracted processing, storage, and network resources via a hypervisor, or the virtual nodes may comprise containers, wherein the containers share resources of the host including in some examples shared binaries. The containers may include their own identifier space and file structure, and are allocated separate virtual network interfaces to provide communications for the virtual nodes.

Here, virtual nodes 120-122 each include a corresponding VNIC of VNICs 140-142, wherein the VNICs may be representative of virtual Ethernet adapters in some examples. These VNICs are mapped to logical ports on primary virtual switch 130 that provides the switching, routing, and firewall operations for each of the virtual nodes. For example, when a communication is required with a second computing system (physical or virtual) a communication may be transferred via the corresponding VNIC where it is identified by primary virtual switch 130. Once the communication is identified, forwarding rules may be applied to the packet, wherein attributes of the packet including IP addresses, MAC addresses, and the like may be identified and compared to corresponding rules. Once a rule is identified, the packet may be forwarded, blocked, or modified in accordance with the rule.

In the example of host 100, in addition to the operations that are provided via primary virtual switch 130, secondary virtual switch 131 is also provided to assist in update operations for primary virtual switch 130. For example, in at least some implementations, primary virtual switch 130 may be implemented as part of hypervisor for virtual machines executing thereon. To update the virtual switch, packet handling functions may be required to tear down their configuration, modify or replace any packet handling functions, and/or reconfigure with the required operations for virtual nodes 120-122. Consequently, secondary virtual switch 131 may be used in some examples to prevent modification to VNICs 140-142 while updates are provided to primary virtual switch 130. These modifications may include reconfiguring TCP settings and other similar protocol settings for communications from the virtual node.

Figure 2:
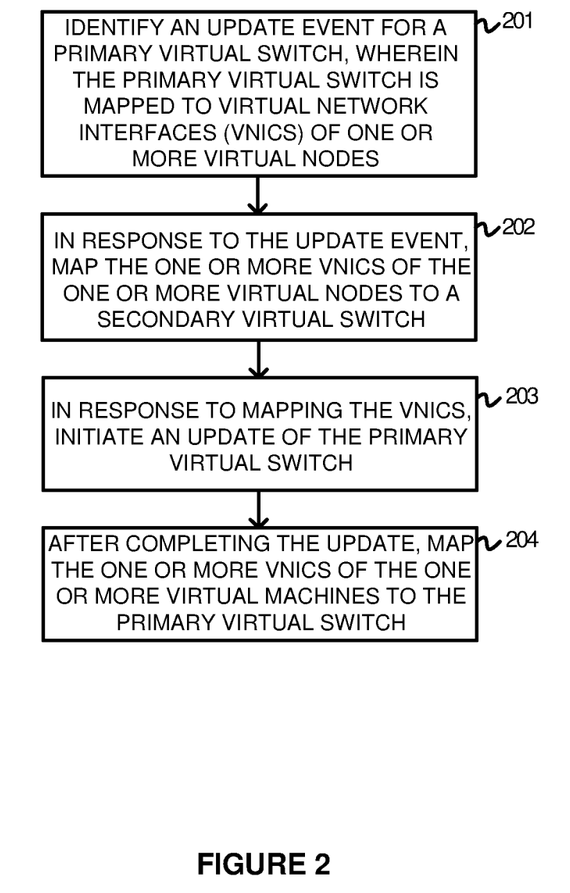
FIG. 2 illustrates an operation of a host to migrate virtual nodes between virtual switches according to an implementation.

FIG. 2 illustrates an operation 200 of a host to migrate virtual nodes between virtual switches according to an implementation. The processes of operation 200 are provided parenthetically in the paragraphs that follow with reference to systems and elements of host 100 of FIG. 1.

As depicted, operation 200 includes identifying (201) an update event for a primary virtual switch, wherein the primary virtual switch is mapped to VNICs of one or more virtual nodes. Referring to host 100, VNICs 140-142 of corresponding virtual nodes 120-122 are mapped to ports on primary virtual switch 130. This mapping permits primary virtual switch 130 to provide network forwarding operations for virtual nodes 120-122, wherein the forwarding may be between virtual nodes on the same host, or may be computing nodes of separate computing systems. While providing the forwarding operations, an administrator or an automated process may trigger an update to the software modules of the primary virtual switch. In response to the update event, operation 200 maps (202) the one or more VNICs of the one or more virtual nodes to a secondary virtual switch. This secondary virtual switch may be executing prior to the update event, or may be initiated in response to the update event in some implementations. Once the secondary virtual switch is available for virtual nodes 120-122, the VNICs 140-142 of the nodes may be mapped to the secondary virtual switch, wherein mapping may include mapping VNICs 140-142 to ports of secondary virtual switch 131.

In some implementations, secondary virtual switch 131 may not provide the same operations as primary virtual switch 130. In particular, because primary virtual switch 130 may include packet handling functions that are required to be updated, secondary virtual switch 131 may be configured such that the resources being updated on the first virtual switch are not used. As an example, secondary virtual switch 131 may not use the same firewall functions and/or configurations as primary virtual switch 130. Thus, in some implementations, because the firewall resources are unavailable, the packets cannot be properly inspected. As a result, secondary virtual switch 131 may drop packets or otherwise fail to provide network connectivity to the virtual nodes when communicated to and from other virtual nodes on the same host or other hosts. The virtual nodes may experience the loss of connectivity as a network outage. Because the period of time it takes to update the relied-upon resources is brief, the brief loss of network connectivity may be considered an acceptable alternative to the lengthy process of migrating all the virtual nodes off of the host being updated.

After VNICs 140-142 are mapped to secondary virtual switch 131, operation 200 initiates (203) an update of the primary virtual switch. This update procedure may include ceasing operations of any required packet handling functions, removing any configurations for the primary virtual switch, or any other similar operations to make primary virtual switch 130 prepared for new and modified software. Once stopped, new and/or modified files may be installed for the virtual switch. This installation may include extracting the modules from an installer and storing the modules in locations on host 100 to support the improved stability or improved functionality for the virtual switch.

After completing the update to primary virtual switch 130, operation 200 on host 100 further maps (204) the one or more VNICs of the one or more virtual machines to the primary virtual switch. In some implementations, prior to remapping the virtual nodes to primary virtual switch 130, operation 200 may ensure that the forwarding configuration is prepared for primary virtual switch 130. Once remapped, connectivity may be restored to the virtual nodes permitting the virtual nodes to resume communications with other physical and virtual systems. In some examples, in temporarily providing the connections to secondary virtual switch 131, the VNICs may be prevented from resetting active connections. As a result, TCP configurations and other similar protocol configurations may be maintained for each of the VNICs, permitting primary virtual switch 130 to be updated with minimal effect on the VNIC connections.

Figure 3A:
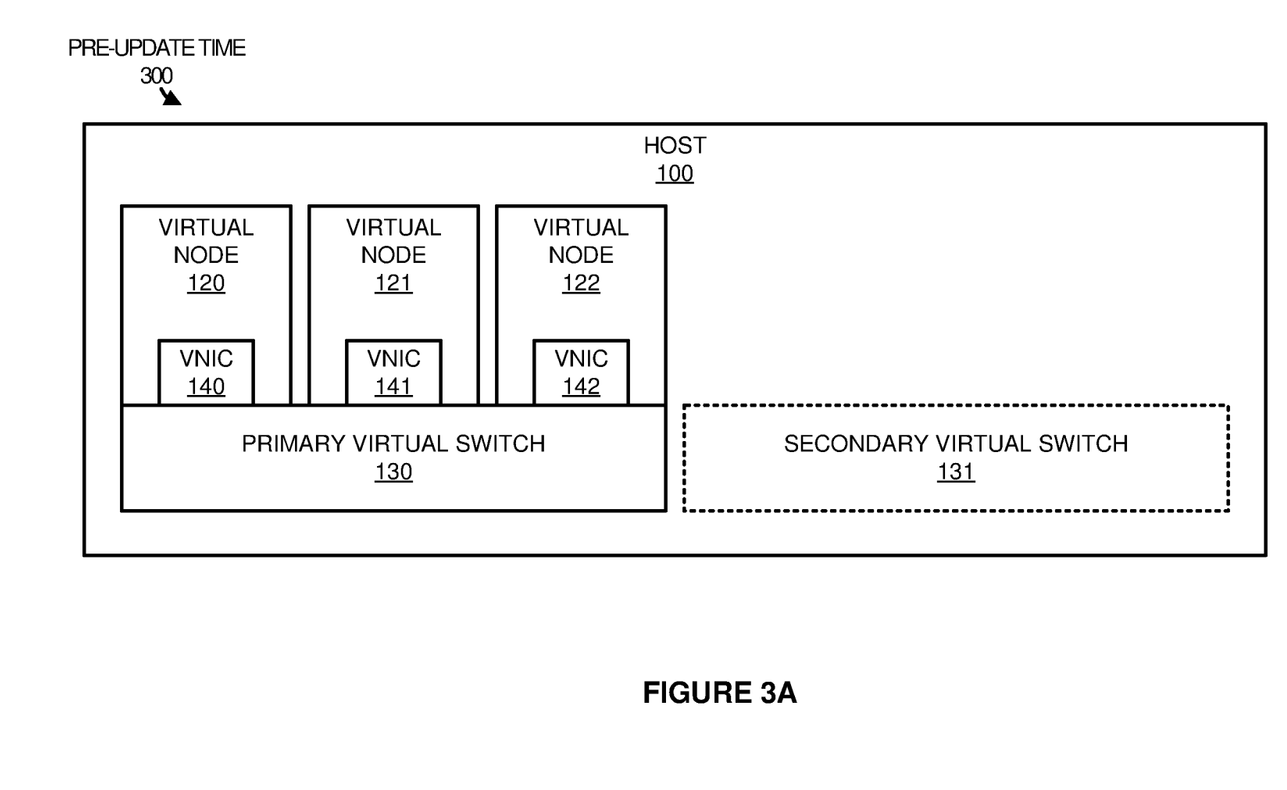
FIGS. 3A-3C illustrate an operational scenario of migrating virtual nodes between virtual switches on a host according to an implementation.
Figure 3B:
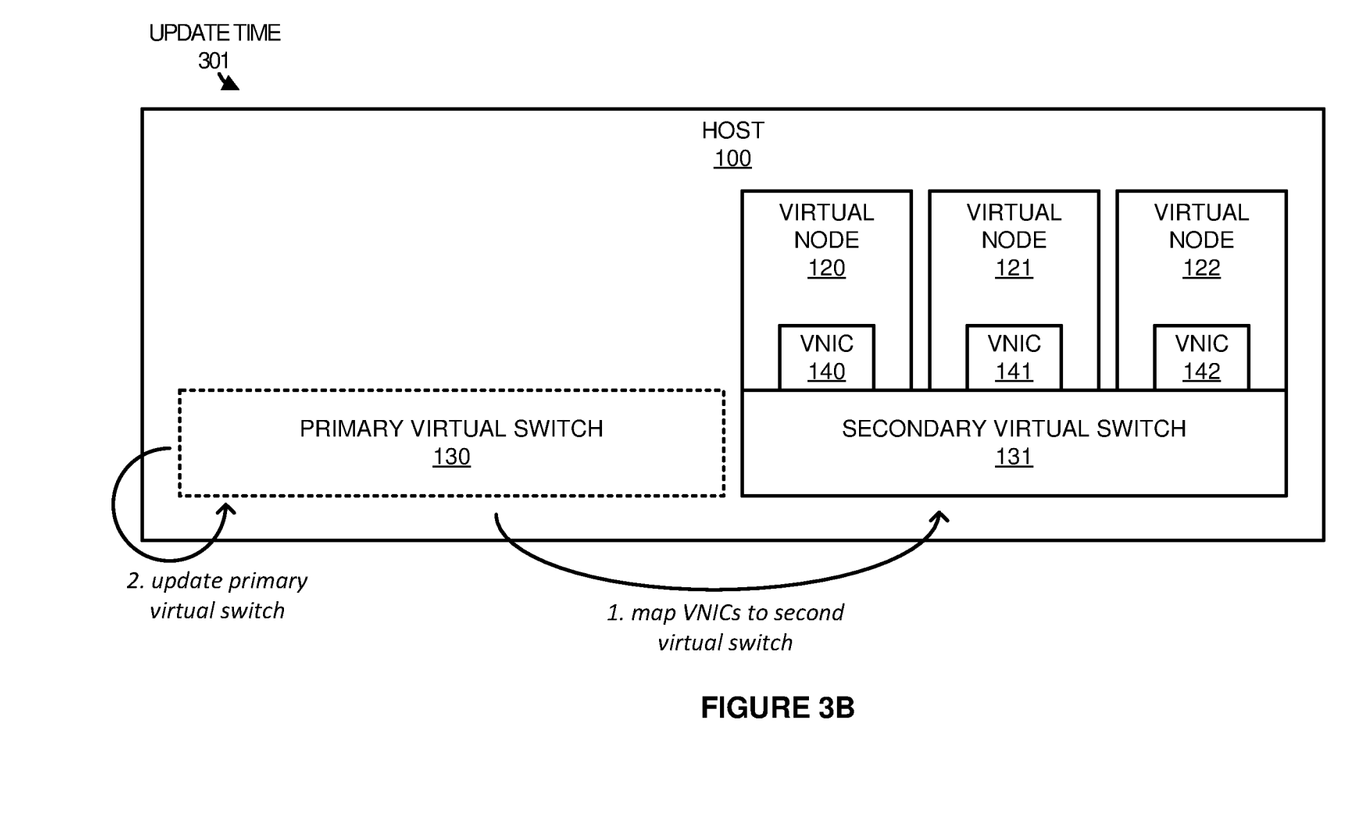
Figure 3C:
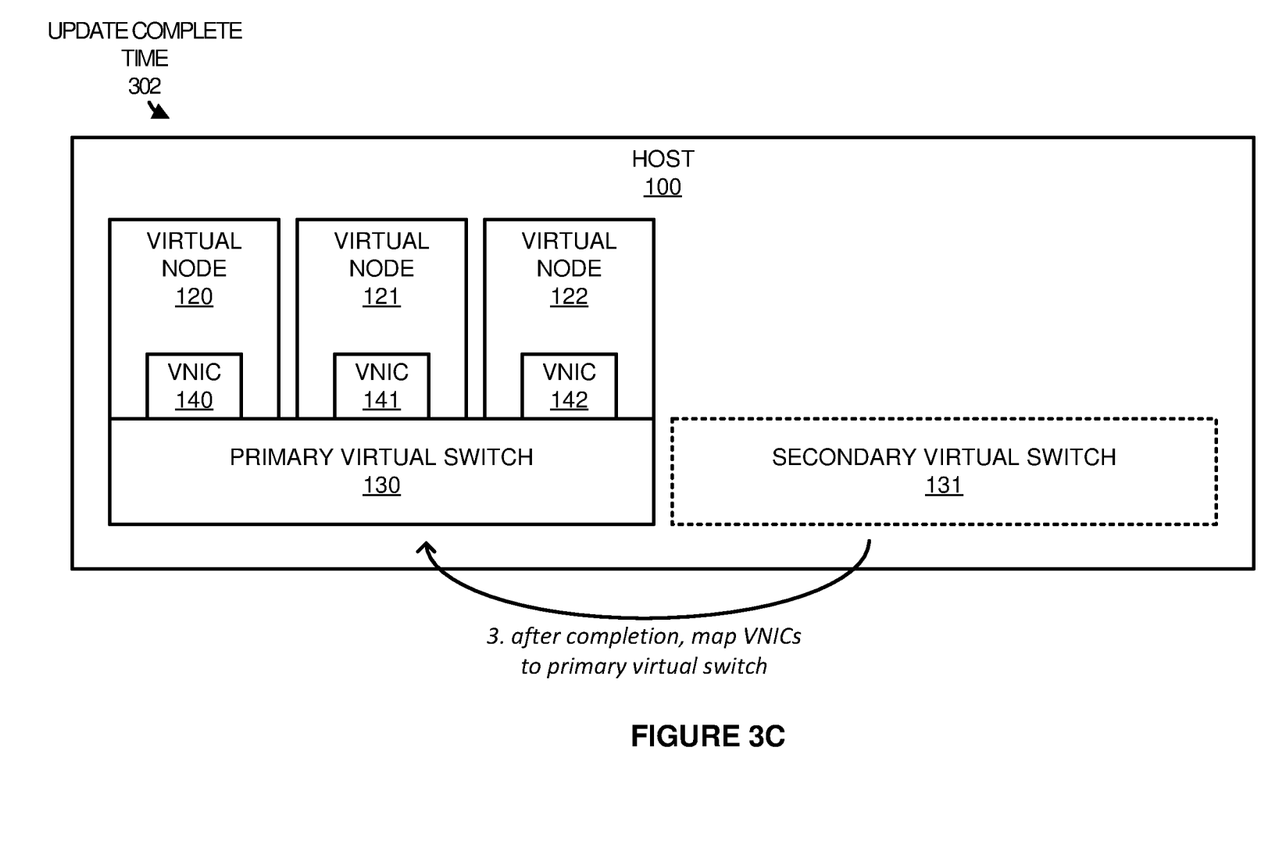

FIGS. 3A-3C illustrate an operational scenario of migrating virtual nodes between virtual switches on a host according to an implementation. FIGS. 3A-3C include systems and elements from host 100 of FIG. 1.

Referring first to pre-update time 300 of FIG. 3A, primary virtual switch 130 is mapped to VNICs 140-142 of virtual noes 120-122, respectively. This mapping permits primary virtual switch 130 to provide switching, routing, and firewall operations for outgoing and incoming communications of virtual nodes 120-122. To provide the mapping, each VNIC of VNICs 140-142 may be mapped to a port of the virtual switch. Once mapped, primary virtual switch 130 may forward, block, and modify packets as they are communicated to and received from the virtual nodes. This may include packets that are received from other host and physical computing systems.

Turning to update time 301 in FIG. 3B, during the operation of primary virtual switch 130, an update may be identified for the virtual switch. This update may be triggered by an administrator of host 100, an automated process executing on host 100, or in some other similar manner. In response to identifying the update, VNICs 120-122 may be mapped, at step 1, to secondary virtual switch 131. In some implementations, secondary virtual switch 131 may be initiated in response to identifying the update event, however, it should be understood that secondary virtual switch 131 may be executing prior to the update event. Secondary virtual switch may include a plurality of ports which are mapped or associated with VNICs of virtual nodes executing on the host. Once mapped, secondary virtual switch 131 may be responsible for switching, routing, and firewall operations for the virtual nodes.

In some implementations, secondary virtual switch 131 may be configured such that one or more packet handling functions or other resources that are used by primary virtual switch are not used by secondary virtual switch 131. For example, one or more packet handling functions may be used to provide the switching operations of primary virtual switch 130. To ensure that the modules are capable of being updated, secondary virtual switch 131 will not share the software modules with primary virtual switch 130. As a result, secondary virtual switch 131 may employ different versions of the packet handling functions or may employ a limited version of the virtual switch, such that the primary virtual switch and/or associated packet handling functions are capable of being updated for the primary virtual switch while the virtual nodes are mapped to secondary virtual switch 131. After the mapping is complete, primary virtual switch 130 is updated, at step 2. This update may include extracting new files and software modules from an installer application, and storing the files and software modules in appropriate storage locations of host 100. This installer application may be made available via an internet download, a Universal Serial Bus drive, or some other media to host 100.

Referring to update complete time 302 of FIG. 3C, after the update is completed, VNICs 120-122 may be mapped, at step 3, to primary virtual switch 130. In some implementations, this mapping may include mapping VNICs 140-142 to ports of primary virtual switch 130, wherein primary virtual switch 130 may continue to provide the required networking operations for virtual nodes 120-122. In some implementations, this may include making connectivity available to virtual nodes based on forwarding rules for the computing environment. These forwarding rules may be made available to primary virtual switch 130 prior to remapping the virtual nodes to the primary virtual switch, such that the forwarding rules may be implemented upon mapping of the VNICs.

In some implementations, secondary virtual switch 131 may be used to maintain the VNIC configurations for virtual nodes 120-122, but limit the communications of virtual nodes 120-122. In particular, because packet handling functions and other dependencies may be limited or unavailable to secondary virtual switch 131, forwarding rules may not be available for communications by the virtual nodes. Consequently, in the time that virtual nodes 120-122 are mapped to secondary virtual switch 131, a network outage may appear for the virtual nodes. Once the update is completed and the nodes are migrated to primary virtual switch 130, then connectivity may be resumed based on forwarding rules defined for primary virtual switch 130. Although secondary switch 131 may not provide the same network connectivity as primary virtual switch 130, the connection to secondary virtual switch 131 may be used to prevent each of the VNICs from resetting their network connections. This permits TCP configurations and other similar protocol configurations to be maintained by the VNICs during the update process to primary virtual switch 130

Figure 4:
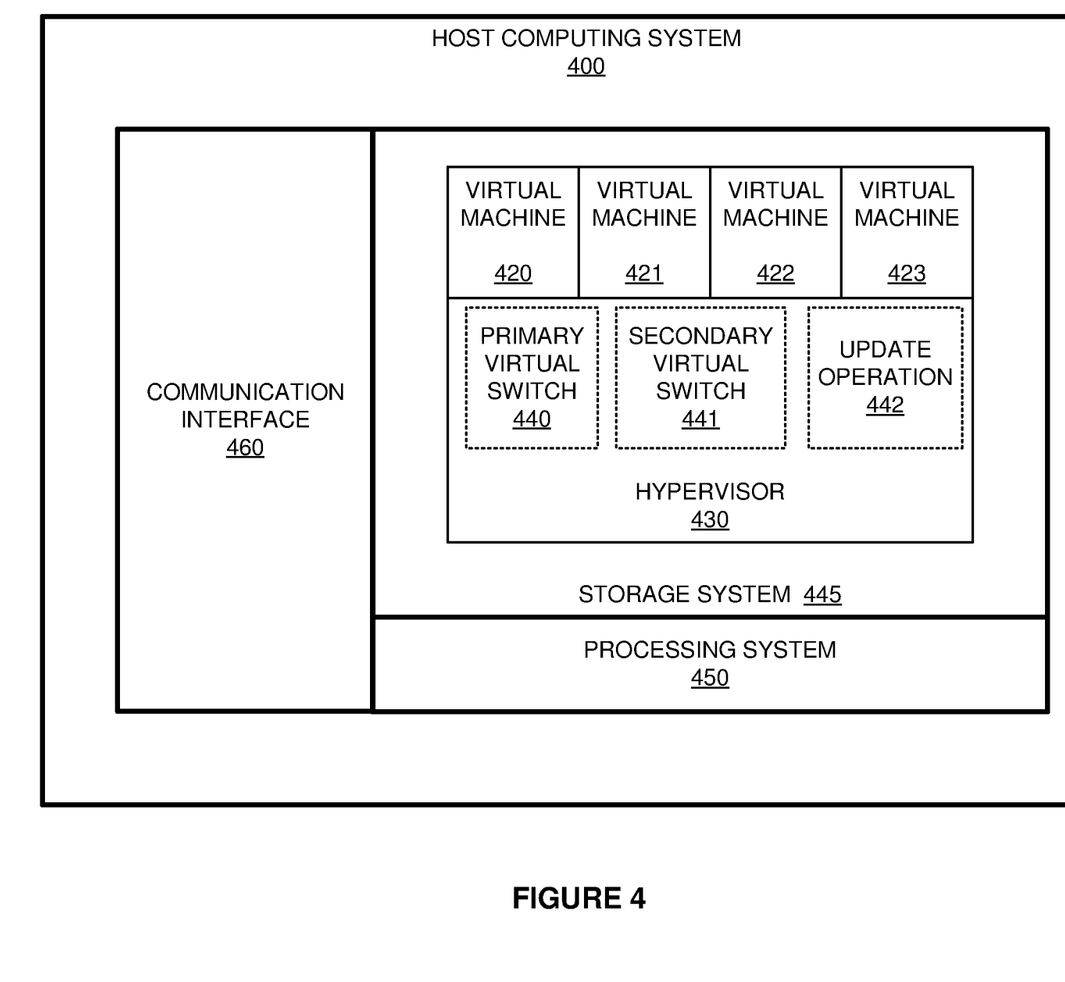
FIG. 4 illustrates a host computing system for a plurality of virtual machines according to an implementation.

FIG. 4 illustrates a host computing system 400 for a plurality of virtual machines according to an implementation. Host computing system 400 is representative of any computing system or systems with which the various operational architectures, processes, scenarios, and sequences disclosed herein for a host can be implemented. Host computing system 400 is an example of host 100 of FIGS. 1-3, although other examples may exist. Host computing system 400 includes storage system 445, processing system 450, and communication interface 460. Processing system 450 is operatively linked to communication interface 460 and storage system 445. Host computing system 400 may further include other components such as a battery and enclosure that are not shown for clarity.

Communication interface 460 comprises components that communicate over communication links, such as network cards, ports, radio frequency (RF), processing circuitry and software, or some other communication devices. Communication interface 460 may be configured to communicate over metallic, wireless, or optical links. Communication interface 460 may be configured to use Time Division Multiplex (TDM), Internet Protocol (IP), Ethernet, optical networking, wireless protocols, communication signaling, or some other communication format—including combinations thereof. Communication interface 460 may be configured to communicate with other host computing systems in a computing environment, and may further be configured to communicate with one or more networked computing systems and devices.

Processing system 450 comprises microprocessor and other circuitry that retrieves and executes operating software from storage system 445. Storage system 445 may include volatile and nonvolatile, removable and non-removable media implemented in any method or technology for storage of information, such as computer readable instructions, data structures, program modules, or other data. Storage systems 445 may be implemented as a single storage device, but may also be implemented across multiple storage devices or sub-systems. Storage system 445 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 450 is typically mounted on a circuit board that may also hold the storage system. The operating software of storage system 445 comprises computer programs, firmware, or some other form of machine-readable program instructions. The operating software of storage system 445 comprises hypervisor 430 with virtual machines 420-423. The operating software on storage system 445 may further include an operating system, utilities, drivers, network interfaces, applications, or some other type of software. When read and executed by processing system 450 the operating software on storage system 445 directs host computing system 400 to operate as described herein.

In at least one implementation, hypervisor 430 when read and executed by processing system 450 directs processing system to provide abstracted computing components to virtual machines 420-423. These abstracted components include storage resources (such as virtual disks), processing systems, and virtual network interfaces. Virtual machines 420-423 may each be allocated their own operating system and user space, such that each of the virtual machines may operate independently as a separate computing node on host computing system 400.

In addition to providing the abstracted resources to the virtual machines, hypervisor 430 further includes primary virtual switch 440, secondary virtual switch 441, and update operation 442, which are used to provide software defined networking for virtual machines 420-423. In particular, update operation 442 when executed by processing system 450 directs processing system 450 to identify an update event for primary virtual switch, wherein ports of primary virtual switch are mapped to VNICs of virtual machines 420-423. In response to the event, update operation 442 maps the VNICs of virtual machines 420-423 to secondary virtual switch 441 and, after mapping the virtual machines, initiates the required update operations to primary virtual switch 440. Once updated, update operation 442 may direct processing system 450 to remap virtual machines 420-423 to primary virtual switch 440 to permit the updated switch to provide networking operations for virtual machines 420-423.

In some implementations, secondary virtual switch 441 provides limited or different operations than primary virtual switch 440. To provide the operations, secondary virtual switch 441 may not require the same packet handling functions as required by primary virtual switch 440. Thus, the packet handling functions for primary virtual switch 440 may be updated without influencing the operations of secondary virtual switch 441. In the meantime, while the packet handling functions are unloaded and the new modules are loaded and executed for primary virtual switch 440, secondary virtual switch 441 may be used to maintain VNIC configurations for virtual machines 420-423, but may be limited in providing forwarding operations for the virtual machines.

Figure 5:
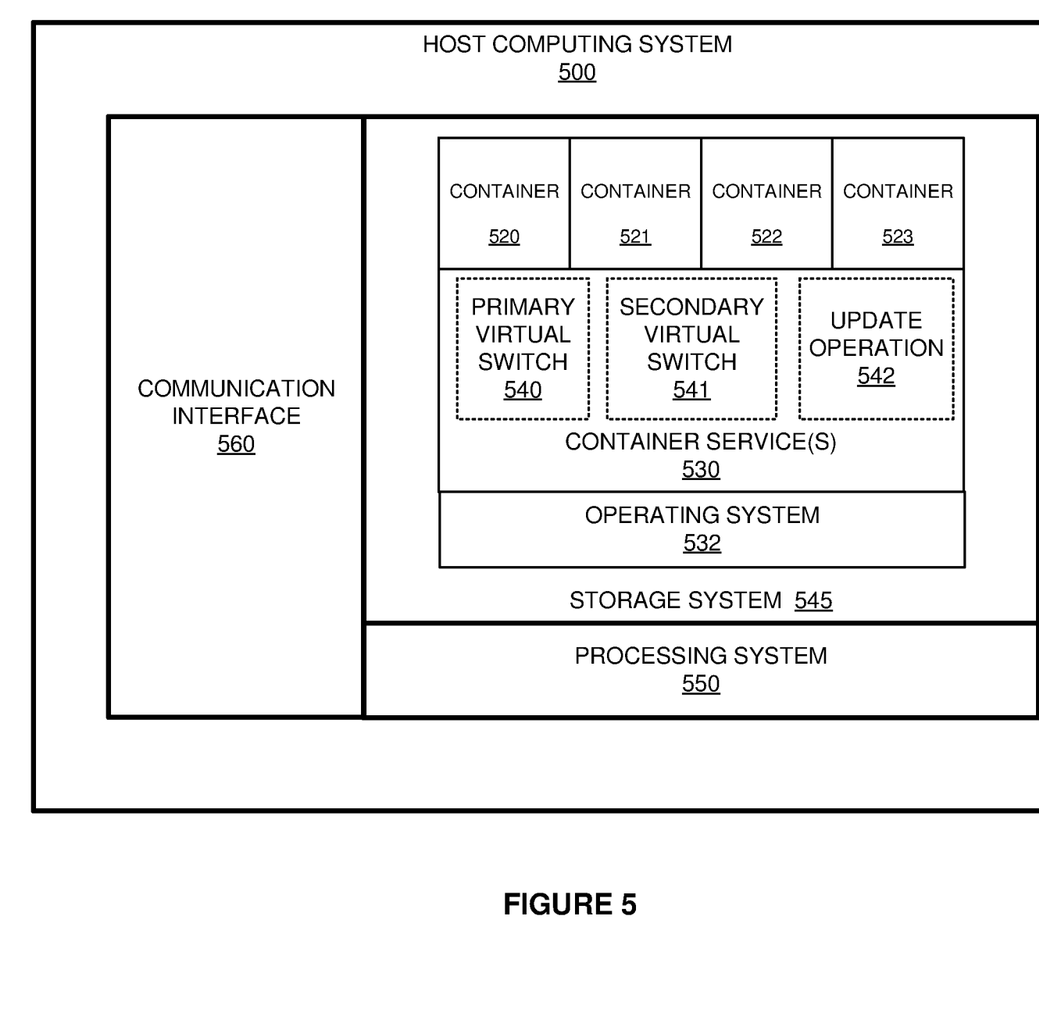
FIG. 5 illustrates a host computing system for a plurality of containers according to an implementation.

FIG. 5 illustrates a host computing system 500 for a plurality of containers according to an implementation. Host computing system 500 is representative of any computing system or systems with which the various operational architectures, processes, scenarios, and sequences disclosed herein for a host can be implemented. Host computing system 500 is an example of host 100 of FIGS. 1-3, although other examples may exist. Host computing system 500 includes storage system 545, processing system 550, and communication interface 560. Processing system 550 is operatively linked to communication interface 560 and storage system 545. Host computing system 500 may further include other components such as a battery and enclosure that are not shown for clarity.

Communication interface 560 comprises components that communicate over communication links, such as network cards, ports, radio frequency (RF), processing circuitry and software, or some other communication devices. Communication interface 560 may be configured to communicate over metallic, wireless, or optical links. Communication interface 560 may be configured to use Time Division Multiplex (TDM), Internet Protocol (IP), Ethernet, optical networking, wireless protocols, communication signaling, or some other communication format—including combinations thereof. Communication interface 560 may be configured to communicate with other host computing systems in a computing environment, and may further be configured to communicate with one or more networked computing systems and devices.

Processing system 550 comprises microprocessor and other circuitry that retrieves and executes operating software from storage system 545. Storage system 545 may include volatile and nonvolatile, removable and non-removable media implemented in any method or technology for storage of information, such as computer readable instructions, data structures, program modules, or other data. Storage system 545 may be implemented as a single storage device, but may also be implemented across multiple storage devices or sub-systems. Storage system 545 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 550 is typically mounted on a circuit board that may also hold the storage system. The operating software of storage systems 545 comprises computer programs, firmware, or some other form of machine-readable program instructions. The operating software of storage system 545 comprises operating system 532, container service(s) 530, and containers 520. The operating software on storage system 545 may further include utilities, drivers, network interfaces, applications, or some other type of software. Although illustrated as separate in the present implementation, it should be understood that container service(s) 530 may be implemented as part of operating system 532 in some examples. When read and executed by processing system 550 the operating software on storage system 545 directs host computing system 500 to operate as described herein.

In at least one implementation, containers 520-523 are executed on host computing system 500 to provide various operations. Containers 520-523 share resources on host computing system 500 including packet handling resources and software functions provided from operating system 532 and container service(s) 530. Containers 520-523 may include their own identifier space and file structure, and are further allocated separate virtual network interfaces to provide communications for the containers. These containers may include Docker® containers, Linux containers, or some other similar type of container.

In supporting the operations of containers 520-523, container service(s) 530 may further provide software defined networking operations. In particular, update operation 542, when read and executed by processing system 550 directs processing system to identify an update event for primary virtual switch 540, wherein primary virtual switch comprises ports mapped to VNICs of containers 520-523. In response to the update, update operation 542 directs processing system 550 to map the VNICs of the containers to secondary virtual switch 541, which may be initiated in response to the update requirement or may be initiated prior to the update requirement. Once mapped, update operations may be provided for primary virtual switch 540, including removing any current configurations, removing packet handling functions, adding new packet handling functions, or any other similar operation, including combinations thereof. After adding and removing the required elements of primary virtual switch 540, the software modules for primary virtual switch 540 may be reinitiated such that they can provide the software defined networking operations for containers 520-523. After the update process is completed, update operation 542 may direct processing system 550 to remap containers to communicate via primary virtual switch 540.

In some implementations, secondary virtual switch 541 may not require the same packet handling resources as are required by primary virtual switch 540. In particular, primary virtual switch 540 may include first network overlay resources and firewall resources that are configured to provide software defined networking operations dictated by an administrator for containers 520-523. To ensure that the resources can be updated, second virtual switch 541 will not require at least a portion of the packet handling resources. Thus, in some examples, second virtual switch 541 may not provide the same functionality as primary virtual switch 540, and in some instances, may be used as a placeholder to preserver the configuration of the VNICs on containers 520-523. This limits a requirement to make modifications to the containers themselves when an update is required for primary virtual switch 540.

Figure 6:
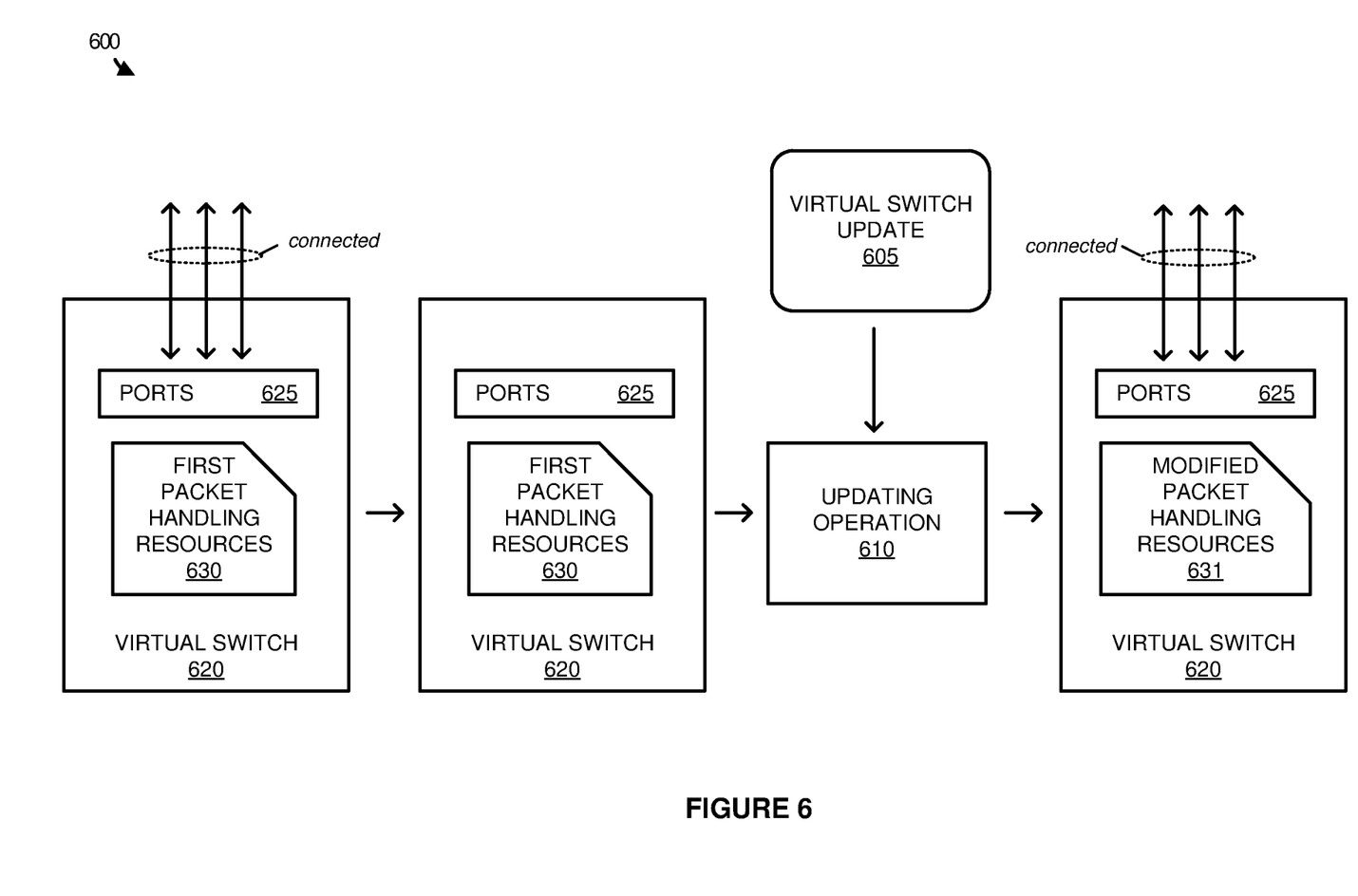
FIG. 6 illustrates an operational scenario of updating a virtual switch according to an implementation.

FIG. 6 illustrates an operational scenario 600 of updating a virtual switch according to an implementation. Operational scenario 600 includes virtual switch 620, virtual switch update 605, and updating operation 610. Virtual switch 620 further includes ports 625 and first packet handling resources 630 that are later converted to modified packet handling resources 631. Virtual switch 620 is representative of any virtual switch from FIGS. 1-5.

As depicted, virtual switch 620 is initially connected or mapped to one or more virtual nodes of a host computing system. Specifically, ports 625 are mapped to VNICs that are allocated to virtual nodes of the host computing system, and once mapped, virtual switch 620 may provide switching, routing, and firewall operations for the connected virtual nodes. During the operation of virtual switch 620, an update event may be identified, which may be triggered by an administrator of a host computing system or may be triggered by an automated process.

In response to identifying the update event, the virtual nodes that are mapped to ports 625 are remapped to a second virtual switch, such that the virtual nodes no longer rely on the operations of virtual switch 620. Once ports 625 are no longer required by virtual nodes of a host computing system, updating operation 610 may be used to provide virtual switch update 605. This update may include replacing, adding, or removing packet handling functions and resources for virtual switch 620 to provide improved operation of the virtual switch. In the present example, upon applying virtual switch update 605, which may be provided via an internet download, a USB device, or some other similar media, modified packet handling resources 631 are made available for virtual switch 620. Once modified packet handling resources are made available for virtual switch 620 and virtual switch 620 is again operational, the virtual nodes that were previously mapped to ports 625 may be again mapped to virtual ports 625.

In some implementations, the packet handling resources 630-631 for virtual switch 620 may be responsible for managing firewall operations and network overlay operations for the virtual nodes. As a result, in some examples, the second virtual switch may be incapable of providing the same operations, as the modules for virtual switch 620. Rather, the second virtual switch may either rely on secondary modules that provide similar or limited functionality in relation to virtual switch 620.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of updating a virtual switch on a host computing system, the method comprising:

identifying an update event for a primary virtual switch to trigger a modification to one or more packet handling functions for the primary virtual switch, wherein one or more ports of the primary virtual switch are mapped to one or more virtual network interfaces (VNICs) of one or more virtual nodes, and wherein the one or more packet handling functions comprise at least a firewall function;

in response to the update event, mapping the one or more VNICs of the one or more virtual nodes to one or more ports of a secondary virtual switch on the host computing system;

in response to mapping the VNICs to the one or more ports of the secondary virtual switch on the host computing system, initiating an update of the primary virtual switch to implement the modification to the one or more packet handling functions;

identifying a completion of the update; and in response to the completion of the update, mapping the one or more VNICs of the one or more virtual nodes to the one or more ports of the primary virtual switch.

2. The method of claim 1, wherein the one or more virtual nodes comprise one or more virtual machines.

3. The method of claim 1, wherein the one or more virtual nodes comprise one or more containers.

4. The method of claim 1, wherein the secondary virtual switch comprises different packet handling functions than the primary virtual switch.

5. The method of claim 1, wherein the one or more packet handling functions comprise one or more network overlay resources.

6. The method of claim 1 further comprises, in response to the update event, initiating execution of the secondary virtual switch on the host computing system.

7. The method of claim 1, wherein the secondary virtual switch provides limited functionality in relation to the primary virtual switch.

8. The method of claim 1, wherein the host computing system comprises one of a physical host computing system or a virtual machine.

9. A computing apparatus comprising:
one or more non-transitory computer readable storage media;
a processing system operatively coupled to the one or more non-transitory computer readable storage media; and
program instructions stored on the one or more non-transitory computer readable storage media to update a virtual switch on a host computing system that, when read and executed by the processing system, direct the processing system to at least:
identify an update event for a primary virtual switch to trigger a modification to one or more packet handling functions for the primary virtual switch, wherein one or more ports of the primary virtual switch are mapped to one or more virtual network interfaces (VNICs) of one or more virtual nodes, and wherein the one or more packet handling functions comprise at least a firewall function;
in response to the update event, map the one or more VNICs of the one or more virtual nodes to one or more ports of a secondary virtual switch on the host computing system;
in response to mapping the VNICs to the one or more ports of the secondary virtual switch on the host computing system, initiate an update of the primary virtual switch to implement the modification to the one or more packet handling functions;
identify a completion of the update; and
in response to the completion of the update, map the one or more VNICs of the one or more virtual nodes to the one or more ports of the primary virtual switch.

10. The computing apparatus of claim 9, wherein the one or more virtual nodes comprise one or more virtual machines.

11. The computing apparatus of claim 9, wherein the one or more virtual nodes comprise one or more containers.

12. The computing apparatus of claim 9, wherein the secondary virtual switch comprises different packet handling functions than the primary virtual switch.

13. The computing apparatus of claim 9, wherein the one or more packet handling functions comprise one or more network overlay resources.

14. The computing apparatus of claim 9, wherein the secondary virtual switch does not require the one or more packet handling functions.

15. The computing apparatus of claim 9, wherein the program instructions further direct the processing system to, in response to the update event, initiate execution of the secondary virtual switch on the host computing system.

16. The computing apparatus of claim 9, wherein the secondary virtual switch provides limited functionality in relation to the primary virtual switch.

17. The computing apparatus of claim 9, wherein the host computing system comprises one of a physical host computing system or a virtual machine.

18. An apparatus comprising:
one or more non-transitory computer readable storage media; and
program instructions stored on the one or more non-transitory computer readable storage media to update a virtual switch on a host computing system that, when read and executed by a processing system, direct the processing system to at least:
identify an update event for a primary virtual switch to trigger a modification to one or more packet handling functions for the primary virtual switch, wherein one or more ports of the primary virtual switch are mapped to one or more virtual network interfaces (VNICs) of one or more virtual nodes, and wherein the one or more packet handling functions comprise at least a firewall function;
in response to the update event, map the one or more VNICs of the one or more virtual nodes to one or more ports of a secondary virtual switch on the host computing system;
in response to mapping the VNICs to the one or more ports of the secondary virtual switch on the host computing system, initiate an update of the primary virtual switch to implement the modification to the one or more packet handling functions;
identify a completion of the update; and
in response to the completion of the update, map the one or more VNICs of the one or more virtual nodes to the one or more ports of the primary virtual switch.

19. The apparatus of claim 18, wherein the secondary virtual switch comprises different packet handling functions than the primary virtual switch.

20. The apparatus of claim 18, wherein the secondary virtual switch does not require the one or more packet handling functions.

* * * * *